US012700763B2

(12) United States Patent
Yang et al.

(10) Patent No.: US 12,700,763 B2
(45) Date of Patent: Aug. 4, 2026

(54) ROTOR HAVING KEYS ARRANGED IN STRAIGHT LINE IN VERTICAL DIRECTION AND METHOD OF MANUFACTURING THE SAME

(71) Applicants: Hyundai Motor Company, Seoul (KR); Kia Corporation, Seoul (KR); JTSC Co., Ltd, Hwaseong-si (KR)

(72) Inventors: Hong Seok Yang, Suwon-si (KR); Jae Won Ha, Hwaseong-si (KR); Jin Ju, Hwaseong-si (KR); Moung Gyun Shin, Hwaseong-si (KR)

(73) Assignees: Hyundai Motor Company, Seoul (KR); Kia Corporation, Seoul (KR); JTSC Co., Ltd., Hwaseong-si (KR)

( * ) Notice: Subject to any disclaimer, the term of this patent is extended or adjusted under 35 U.S.C. 154(b) by 236 days.

(21) Appl. No.: 18/305,934

(22) Filed: Apr. 24, 2023

(65) Prior Publication Data

US 2024/0186848 A1     Jun. 6, 2024

(30) Foreign Application Priority Data

Dec. 5, 2022     (KR) ........................ 10-2022-0167763

(51) Int. Cl.
  *H02K 1/27*        (2022.01)
  *H02K 1/276*       (2022.01)
  *H02K 15/03*       (2025.01)
(52) U.S. Cl.
  CPC ............. *H02K 1/276* (2013.01); *H02K 15/03* (2013.01); *H02K 2213/03* (2013.01)

(58) Field of Classification Search
  CPC .... H02K 1/276; H02K 15/03; H02K 2213/03; H02K 1/2766; H02K 1/28; H02K 15/02; H02K 2201/06; H02K 2201/09
  See application file for complete search history.

(56) References Cited

U.S. PATENT DOCUMENTS 10,193,426 B2     1/2019   Ando et al.
11,223,262 B1 *   1/2022   Bender .................. H02K 15/03

FOREIGN PATENT DOCUMENTS

JP        2010045921 A  *  2/2010
JP        2021180565 A     11/2021
JP        2021197880 A     12/2021
KR        101311927 B1      9/2013
KR        20220047077 A     4/2022
KR        102399935 B1      5/2022

* cited by examiner

*Primary Examiner* — Thomas Truong
(74) *Attorney, Agent, or Firm* — Slater Matsil, LLP

(57) ABSTRACT

An embodiment rotor includes a stacked core including stacked lamination sheets. The lamination sheets include lamination segments arranged in a circle, the stacked core has an upper layer lamination segment coupled to a lower layer lamination segment with a phase difference therebetween of a first angle with respect to a center of the stacked core, the stacked lamination segments have keys arranged in a straight line on an inner surface of the stacked core so that the keys are inserted into a key way disposed in a motor shaft in an axial direction, the lamination segments have a substantially identical shape and are arranged with an interval of a second angle with respect to a center of the rotor thus having a substantially identical pattern, and the lamination segments include upper and lower layer coupling portions repeatedly disposed at intervals of the second angle in a circumferential direction.

20 Claims, 11 Drawing Sheets

| SLOT NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| S \ ANGLE | 337.5 | 315 | 292.5 | 270 | 247.5 | 225 | 202.5 | 180 | 157.5 | 135 | 112.5 | 90 | 67.5 | 45 | 22.5 | 0 |
| 1 | | | | | | | | ▓ | | | | | | | | K1 |
| 2 | | | | ▓ | | | | | | | | K1 | | | | |
| 3 | | | | | | | | K1 | | | | | | | | ▓ |
| 4 | | | | | K1 | | | | | | ▓ | ▓ | | | | |
| 5 | | | K1 | | | | | | | | | | | | | |
| 6 | | | | | | | ▓ | | | | | | | | K1 | |
| 7 | | | ▓ | | | | | | | | K1 | | | | | |
| 8 | | | | | | | K1 | | | | | | | | ▓ | |
| 9 | | | | | | K1 | | | | | | | | | | |
| 10 | | K1 | | | | | ▓ | | | ▓ | | | | | | |
| 11 | | | | | | | ▓ | | | | | | | K1 | | |
| 12 | ▓ | ▓ | | | | | | | | K1 | | | | | | |
| 13 | ▓ | | | | | | | | K1 | | | | | | | |
| 14 | | | | | K1 | | | | | | | | ▓ | | | |
| 15 | K1 | | | | | | | | ▓ | | | | K1 | | | |
| 16 | | | | | ▓ | | | | | | | | | | | |
| 17 | | | | | ▓ | | | | | | | ▓ | | | | |
| 18 | | | | | | | | K1 | | | | | | | | ▓ |
| 19 | | | | | K1 | | | | | | | ▓ | | | | |
| 20 | | | | | | | | ▓ | | | | | | | | ▓ |
| 21 | | | | | | | ▓ | | | | | | | | ▓ | |
| 22 | | | ▓ | | | | | | | | K1 | | | | | |
| 23 | | | | | | | K1 | | | | | | | | ▓ | |
| 24 | | | K1 | | | | | | | | ▓ | | | | | |
| 25 | | K1 | | | | | | | | ▓ | | | | K1 | | |
| 26 | | | | | | ▓ | | | | | | | | | | |
| 27 | | ▓ | | | | | | | | K1 | | | | ▓ | | |
| 28 | | | | | | K1 | | | | | | | | | | |
| 29 | | | | | K1 | | | | | | | | ▓ | | | |
| 30 | K1 | | | | | | | | ▓ | | | | | | | |
| 31 | ▓ | | | | ▓ | | | | | | | | K1 | | | |
| 32 | ▓ | | | | | | | | K1 | | | | | | | |
| 33 | | | | | | | | K1 | | | | | | | | ▓ |

ROTOR HAVING KEYS ARRANGED IN STRAIGHT LINE IN VERTICAL DIRECTION AND METHOD OF MANUFACTURING THE SAME

CROSS-REFERENCE TO RELATED APPLICATIONS

This application claims the benefit of Korean Patent Application No. 10-2022-0167763, filed on Dec. 5, 2022, which application is hereby incorporated herein by reference.

TECHNICAL FIELD

The present invention relates to a rotor of a rotating electric device and a method of manufacturing the same.

BACKGROUND

In today's vehicle, a rotating electric device such as a generator and a motor is widely used. For example, an eco-friendly vehicle such as a battery electric vehicle, a hybrid vehicle, and a fuel cell vehicle is an electric vehicle in a broad sense that travels using a motor.

Such an eco-friendly vehicle is equipped with a motor, which is a driving source for driving the vehicle, and an inverter configured to drive and control the motor by converting direct current (DC) from a high voltage power source into alternating current (AC) and applying the same to the motor.

As described above, in the eco-friendly vehicle, the motor is used to generate a driving force for traveling, and for the motor configured to drive the vehicle, that is, a driving motor, high efficiency and power density are needed.

As a driving motor in the vehicle, a motor in which a coil is wound on a stator core and a permanent magnet is installed in a rotor core may be used. As an example, an interior permanent magnet synchronous motor in which the permanent magnet is embedded in the rotor core may be used as a driving motor.

The permanent magnet synchronous motor may be classified into a surface permanent magnet motor (SPMM) in which the permanent magnet is installed on the surface of the rotor and an interior permanent magnet synchronous motor (IPMSM) in which the permanent magnet is embedded in the rotor, depending on the method of installing the permanent magnet in the rotor.

Meanwhile, the motor includes the rotor and the stator as main components, and the rotor core among the rotor components may have a structure of a stacked body (stacked core) in which a plurality of lamination sheets, for example, electric steel sheets, which are magnetic bodies, are stacked.

In the case of the interior permanent magnet synchronous motor, when manufacturing the stacked core of the rotor, which is the stacked body, insertion holes are arranged at regular intervals in a circumferential direction, and the permanent magnet is inserted into each of the insertion holes.

To describe the stacked core in more detail, the stacked core manufactured by stacking lamination sheets (e.g., magnetic electric steel sheets) is used in a rotor or stator of a rotating electric device such as a generator or a motor, and the method of manufacturing the same is already known in the art.

FIG. 1 illustrates an example of a stacked core 20 in which lamination sheets 10 are stacked. Each of the lamination sheets 10 has a circular shape and has a center having formed therein a shaft hole 11. At the outer side of the shaft hole 11 and the outer circumferential side of the lamination sheet 10, a plurality of slots is radially formed.

In addition, the lamination sheet 10 has an outer side, with respect to the shaft hole 11 as a center, having formed therein a plurality of interlocking tabs 14. As illustrated in FIG. 2, the interlocking tabs 14 are each a concave portion embossed downwards. When the lamination sheets 10 are stacked one on top of one another, the interlocking tabs 14 formed in an upper lamination sheet 10 are press fitted into the interlocking tabs 14 formed in a lower lamination sheet 10, thereby coupling the upper lamination sheet 10 to the lower lamination sheet 10.

In addition, the stacked core 20 may be manufactured using a stacked core manufacturing apparatus. Manufacturing of the stacked core 20 is disclosed in Korean Patent Registration No. 10-0578043 and Korean Patent Registration No. 10-0762744. In the following, one of the above manufacturing methods will be exemplarily described with reference to FIGS. 3 and 4.

The stacked core manufacturing apparatus includes a slot forming portion 30, a counter hole forming portion 40, a shaft hole forming portion 50, an interlocking tab forming portion 60, and a blanking portion 70. The stacked core manufacturing apparatus has a press body 80 having mounted thereon pin punches 30a, 40a, 50a, and 60a having various shapes and functions and configured to perform stamping on a metal strip 1, and a blank block 70a configured to perform blanking on the metal strip 1.

In addition, a die body 82 has formed therein punch holes 30b, 40b, 50b, and 60b corresponding to the pin punches 30a, 40a, 50a, and 60a, and has mounted therein a stacking barrel 70b corresponding to the blank block 70a.

The lamination sheet 10 is manufactured by supplying the metal strip 1 elongated in a longitudinal direction to the stacked core manufacturing apparatus. The metal strip 1 is moved while periodically repeating moving and stopping using a predetermined conveyor (not shown). In a first step I, slots are formed using the slot forming portion 30. Here, the metal strip 1 is perforated so as to form a plurality of slots 12.

Thereafter, the metal strip 1 is in a stand-by state in a second step II, and then moves to a third step III to undergo a counter hole forming process. In the counter hole forming process, in order to stack a predetermined number of stacked cores 20 and then separate the same, counter holes 19 are formed at positions where the interlocking tabs 14 are to be formed.

Such a counter hole forming process is not performed for all lamination sheets 10, but may be performed, for example, once in twenty times depending on a predetermined thickness of the stacked core 20. When the counter hole forming process is performed, an interlocking tab formation position on the metal strip 1 is punched using the pin punch 40a, and when the counter hole forming process is not performed, the counter hole forming process is passed as an idle process.

Next, in the process of a fourth step IV, the shaft hole 11 is perforated at the central portion of a lamination sheet. Subsequently, the metal strip 1 is advanced by 1 pitch, and then is pressed downwards at a plurality of points around the shaft hole 11 using the embossing pin punch 60a in the embossing process of a fifth step V so as to form the interlocking tabs 14. The interlocking tab 14 has a concave upper surface and a convex lower surface.

A sixth step VI is an idle process, in which the metal strip 1 is in a stand-by state for a seventh step VII and no treatment is performed. The seventh step VII is a process of blanking the metal strip 1 to manufacture the lamination sheets 10 and then stacking the lamination sheets 10 to complete the stacked core 20. In this step, the outline of the lamination sheet 10 is cut using the blank block 70*a*, and then the lamination sheet 10 is separated from the metal strip 1.

The separated lamination sheet 10 is pushed into the stacking barrel 70*b* using the blank block 70*a*, and then is stacked on the upper surface of another lamination sheet 10 that is already stacked. Here, the lower convex portion of each of the interlocking tabs 14 in the upper layer lamination sheet 10 is fitted into the upper concave portion of each of the interlocking tabs 14 in the lower layer lamination sheet 10, and thus the lamination sheets 10 may be fixed while being stacked on top of each other.

When a predetermined number, e.g., twenty, of the lamination sheets 10 is stacked in the above described process, and then the lamination sheet 10 having the counter holes 19 instead of the interlocking tabs 14 is blanked and stacked on the twenty lamination sheets 10 in the counter hole forming process, the lamination sheet 10 may be separated because the same does not have the interlocking tabs 14 and the lamination sheets 10 are no longer stacked thereon. The stacked core 20 manufactured in this way is discharged to the outside through a separate outlet.

Into the shaft hole 11, a motor shaft (not shown in the drawing) is inserted into the rotor (stacked core). In addition, keys may be formed on the stacked core so as to unify rotation of the motor shaft and the rotor. The keys are coupled to a key way in the motor shaft.

However, because the keys on the stacked core must be arranged in a straight line in the vertical direction of the rotor (axial direction of the motor shaft), when the rotor is manufactured by index-stacking the lamination sheets 10, there is a problem in that the keys must be aligned in a straight line.

Moreover, when several lamination segments are assembled to complete one lamination sheet 10, a problem of coupling the lamination segments to one another in a circle, a problem of combining an upper layer lamination segment and a lower layer lamination segment with each other, and a problem of arranging keys in a straight line in the index-stacking should be considered.

The above information disclosed in this background section is only for enhancement of understanding of the background of embodiments of the invention, and therefore it may contain information that does not form the prior art that is already known to a person of ordinary skill in the art.

SUMMARY

The present invention relates to a rotor of a rotating electric device and a method of manufacturing the same. Particular embodiments relate to a rotor including a stacked core in which several lamination sheets each having a key are stacked up and down so that the keys are vertically aligned in a straight line and a method of manufacturing the same.

Embodiments of the present invention can solve problems associated with the prior art and provide a method of manufacturing a rotor in which a circular stacked core is manufactured by stacking several lamination sheets up and down, and keys on the upper and lower lamination sheets are arranged in a straight line in a vertical direction.

Another embodiment of the present invention provides a method of manufacturing a rotor in which an end of an upper layer lamination segment is stacked on a portion corresponding to a continuous portion of a lower layer lamination segment (e.g., a middle portion in the lower layer lamination segment) so as to allow the lamination segments of each layer to be coupled to one another to have a circular shape.

Another embodiment of the present invention provides a method of manufacturing a rotor in which lamination segments are index-stacked to manufacture the rotor, but a separate additional coupling means configured to transversely couple the lamination segments in the same layer to one another is not needed.

Another embodiment of the present invention provides a method of manufacturing a rotor in which lamination segments are prepared from a metal strip, the same are index-stacked to complete a circular lamination sheet, and then the circular lamination sheets are stacked one on top of another so that raw materials may be saved and the rotor may maintain straightness in a vertical direction.

Another embodiment of the present invention provides a rotor manufactured using the above methods.

The embodiments of the present invention are not limited to the embodiments mentioned above, and other embodiments not mentioned herein will be clearly understood by those of ordinary skill in the art to which the present invention pertains (hereinafter, "those skilled in the art") based on the description below.

One embodiment of the present invention provides a rotor of a rotating electric device, the rotor including a stacked core including a plurality of lamination sheets stacked one on top of another. Here, the lamination sheets each may include a plurality of lamination segments arranged in a circle, the stacked core may have an upper layer lamination segment coupled to a lower layer lamination segment with a phase difference of a first angle $\theta_1$ with respect to a center of the stacked core, the lamination segments stacked one on top of another may have keys arranged in a straight line on an inner surface of the stacked core so that the keys are inserted into a key way formed in a motor shaft in an axial direction, the lamination sheets each may include lamination segments having a shape repeated in an identical pattern at every second angle $\theta_2$ with respect to a center of the rotor, and the lamination segments each may include upper layer and lower layer coupling portions repeatedly disposed at intervals of the second angle $\theta_2$ in a circumferential direction.

In a preferred embodiment, the lamination sheets each may include lamination segments having a shape repeated in an identical pattern at every second angle $\theta_2$ with respect to the center of the rotor, except for the keys protruding from the inner surface of the stacked core, and the first angle $\theta_1$ and the second angle $\theta_2$ may be calculated using Equations E1 and E2 below:

$$\theta_1 = \frac{360°}{n \times p_1} \times m = \theta_2 \times m, \text{ and} \qquad \text{Equation E1}$$

$$\theta_2 = \frac{360°}{n \times p_1}, \qquad \text{Equation E2}$$

wherein n is a number of lamination segments constituting one lamination sheet, $p_1$ is a number of times ($p_1 \geq 2$) that the shape of the lamination segments is repeated in an identical pattern, except for the keys, in each lamination sheet, and m is an integer greater than or equal to 1 and smaller than $p_1$.

In another preferred embodiment, the lamination segments each may further include through holes repeatedly disposed at intervals of the second angle $\theta_2$ in the circumferential direction.

In still another preferred embodiment, in the stacked core, the through holes in the lamination segments stacked one on top of another may be arranged in a straight line so as to define an insertion hole, and a permanent magnet may be inserted into the insertion hole in the stacked core.

In yet another preferred embodiment, the upper layer and lower layer coupling portions of each of the lamination segments may be interlocking tabs configured to couple the upper layer lamination segment to the lower layer lamination segment.

In still yet another preferred embodiment, in a state where an end of the upper layer lamination segment is arranged to correspond to a continuous portion of the lower layer lamination segment, the upper layer lamination segment may be coupled to the lower layer lamination segment using the upper layer and lower layer coupling portions, thereby allowing the lamination segments arranged in a circle in the same layer to remain coupled to one another without a separate coupling means.

Another embodiment of the present invention provides a method of manufacturing a rotor of a rotating electric device, the method including steps of (a) processing a metal strip with a press mold while the metal strip is repeatedly moved and stopped so as to prepare a lamination segment, (b) blanking the prepared lamination segment and stacking the same in a stacking barrel, then rotating the stacking barrel by a third angle $\theta_3$, (c) repeating steps (a) and (b) until a circular lamination sheet is completed, (d) rotating the stacking barrel by a first angle $\theta_1$ when one layer of the circular lamination sheet is completed, and (e) repeating steps (a) to (d) until a number of stacked lamination sheets reaches a predetermined number. Here, at least one of the plurality of lamination segments constituting each of the lamination sheets may have an inner surface having a key protruding therefrom, the lamination segments stacked one on top of another may have keys arranged in a straight line on an inner surface of a stacked core so that the keys are inserted into a key way formed in a motor shaft in an axial direction, the lamination sheets each may include lamination segments having a shape repeated in an identical pattern at every second angle $\theta_2$ with respect to a center of the rotor, and the lamination segments each may include upper layer and lower layer coupling portions repeatedly disposed at intervals of the second angle $\theta_2$ in a circumferential direction.

In a preferred embodiment, after the number of stacked lamination sheets reaches the predetermined number, steps (a) to (d) may be repeated, but the stacking barrel may be rotated by $-\theta_3$ in step (b) and the stacking barrel may be rotated by $-\theta_1$ in step (d).

In another preferred embodiment, each of the lamination sheets may be provided with two keys at intervals of 180° in the circumferential direction, and an angle $\theta_{key}$ where the key is located in an $s^{th}$ lamination segment may be determined using Equation E3 below, to thereby prepare the lamination segment in step (a) to match the determined angle $\theta_{key}$:

$$\theta_{key} = \frac{360°}{n} \times \left( s - 1 - \frac{s - 1 - \mathrm{mod}(s-1, n)}{n} \times \left( 1 - \frac{m}{p} \right) \right), \qquad \text{Equation E3}$$

wherein $\theta_{key}$ is an angle indicating where the key is located when the sth lamination segment is stacked in the stacking barrel, s is an order of the lamination segment being stacked, mod(s−1, n) is a function representing a remainder when 's−1' is divided by 'n', m is an integer that determines a phase difference between each layer (1≤m<p), and p is a number of slots in each lamination segment (p).

In still another preferred embodiment, the first angle $\theta_1$ and the third angle $\theta_3$ may be calculated using Equations E4 and E5 below:

$$\theta_1 = \frac{360°}{n \times p_1} \times m, \text{ and} \qquad \text{Equation E4}$$

$$\theta_3 = \frac{360°}{n}, \qquad \text{Equation E5}$$

wherein n is a number of lamination segments constituting one lamination sheet, $p_1$ is a number of times ($p_1 \geq 2$) that the shape of the lamination segments is repeated in an identical pattern, except for the keys, in each lamination sheet, and m is an integer greater than or equal to 1 and smaller than $p_1$.

In yet another preferred embodiment, the lamination sheets each may include lamination segments having a shape repeated in an identical pattern at every second angle $\theta_2$ with respect to the center of the rotor, except for the keys protruding from the inner surface of the stacked core, and the first angle $\theta_1$ and the second angle $\theta_2$ may be calculated using Equations E1 and E2 below:

$$\theta_1 = \frac{360°}{n \times p_1} \times m = \theta_2 \times m, \text{ and} \qquad \text{Equation E1}$$

$$\theta_2 = \frac{360°}{n \times p_1}, \qquad \text{Equation E2}$$

wherein n is a number of lamination segments constituting one lamination sheet, $p_1$ is a number of times ($p_1 \geq 2$) that the shape of the lamination segments is repeated in an identical pattern, except for the keys, in each lamination sheet, and m is an integer greater than or equal to 1 and smaller than $p_1$.

In still yet another preferred embodiment, the lamination segments each may further include through holes repeatedly disposed at intervals of the second angle $\theta_2$ in the circumferential direction.

In a further preferred embodiment, in the stacked core, the through holes in the lamination segments stacked one on top of another may be arranged in a straight line so as to define an insertion hole, and a permanent magnet may be inserted into the insertion hole in the stacked core.

In another further preferred embodiment, the upper layer and lower layer coupling portions of each of the lamination segments may be interlocking tabs configured to couple an upper layer lamination segment to a lower layer lamination segment.

In still another further preferred embodiment, in a state where an end of the upper layer lamination segment is arranged to correspond to a continuous portion of the lower layer lamination segment, the upper layer lamination segment may be coupled to the lower layer lamination segment using the upper layer and lower layer coupling portions, thereby allowing the lamination segments arranged in a circle in the same layer to remain coupled to one another without a separate coupling means.

Other aspects and preferred embodiments of the invention are discussed infra.

It is to be understood that the term "vehicle" or "vehicular" or other similar terms as used herein are inclusive of motor vehicles in general, such as passenger automobiles including sport utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein:

FIG. 7 is an enlarged view of a portion VII in FIG. 6;

FIG. 12 is a table showing angles at which keys are located in each layer (s) in the lamination sheet of FIG. 11.

Figure 1:
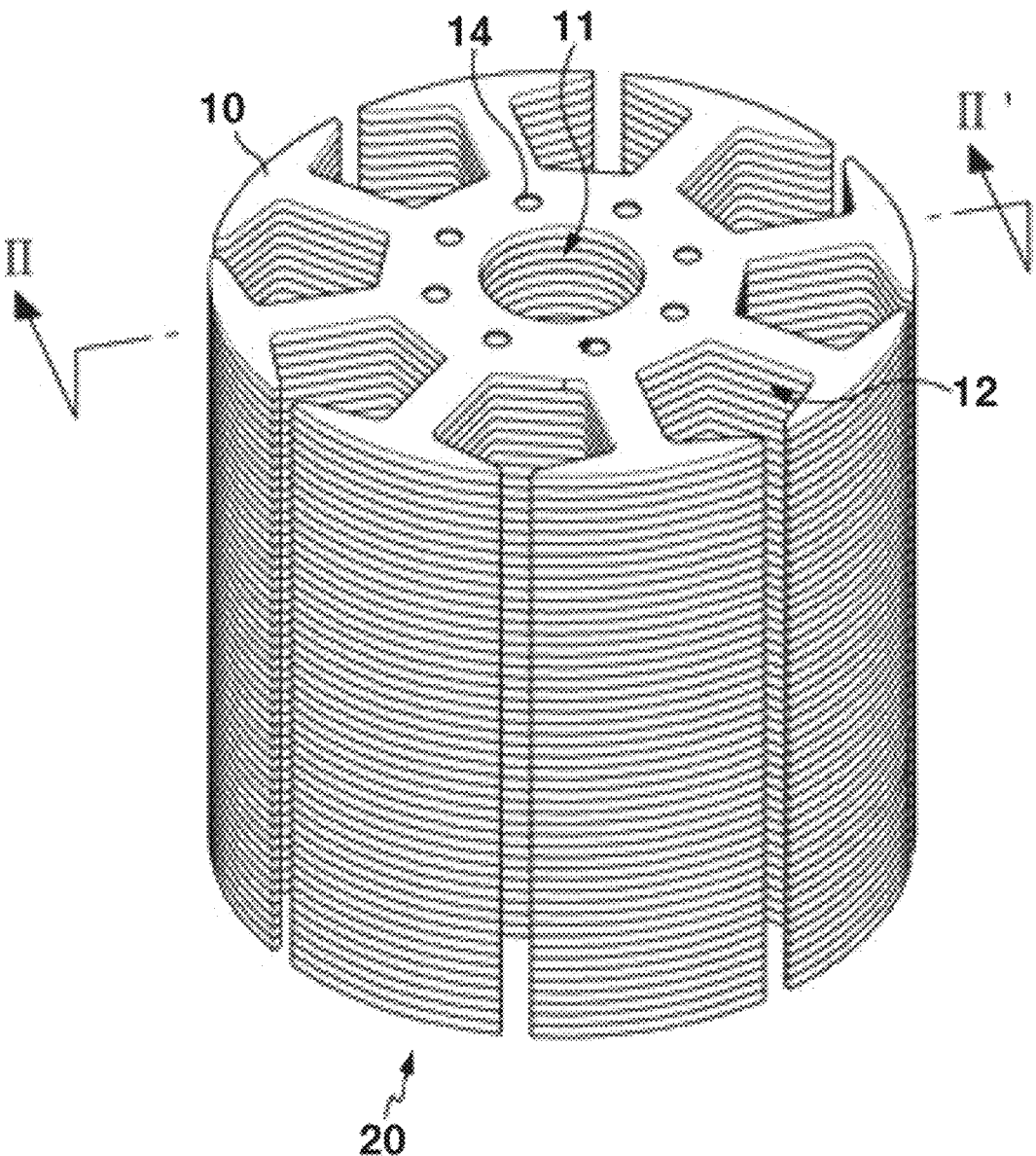
FIG. 1 is a perspective view illustrating a stacked core according to the related art.
Figure 2:
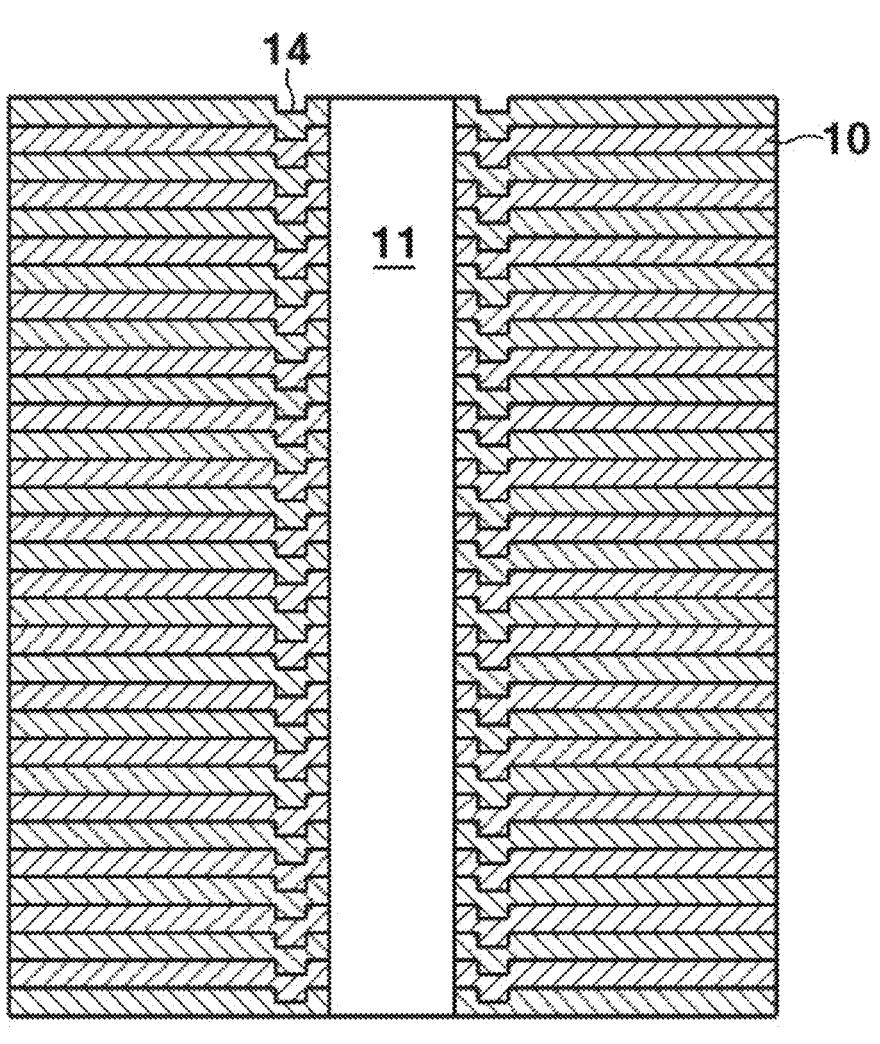
FIG. 2 is a cross-sectional view taken along line II-II' in FIG. 1.
Figure 2:

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes, will be determined in part by the particular intended application and usage environment.

In the figures, reference numbers refer to the same or equivalent parts of embodiments of the present invention throughout the several figures of the drawings.

DETAILED DESCRIPTION OF ILLUSTRATIVE EMBODIMENTS

Hereinafter, embodiments of the present invention will be described in detail with reference to the drawings. Descriptions of specific structures or functions presented in the embodiments of the present invention are merely exemplary for the purpose of explaining the embodiments according to the concept of the present invention, and the embodiments according to the concept of the present invention may be implemented in various forms. In addition, the descriptions should not be construed as being limited to the embodiments described herein, and should be understood to include all modifications, equivalents, and substitutes included in the idea and scope of the present invention.

Meanwhile, in embodiments of the present invention, terms such as first and/or second may be used to describe various components, but the components are not limited to the terms. These terms are only used to distinguish one component from another. For example, a first component could be termed a second component, and similarly, a second component could be termed a first component, without departing from the scope of exemplary embodiments of the present invention.

It will be understood that, when a component is referred to as being "connected to" another component, the component may be directly connected to the other component or intervening components may also be present. In contrast, when a component is referred to as being "directly connected to" another component, there are no intervening components present. Other terms used to describe the relationship between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present invention. In this specification, the singular form includes plural forms unless specified otherwise. The terms "comprises" and/or "comprising" used in this specification mean that the cited component, step, operation, and/or element does not exclude the presence or addition of one or more of other components, steps, operations, and/or elements.

Structure of Rotor

Figure 5:
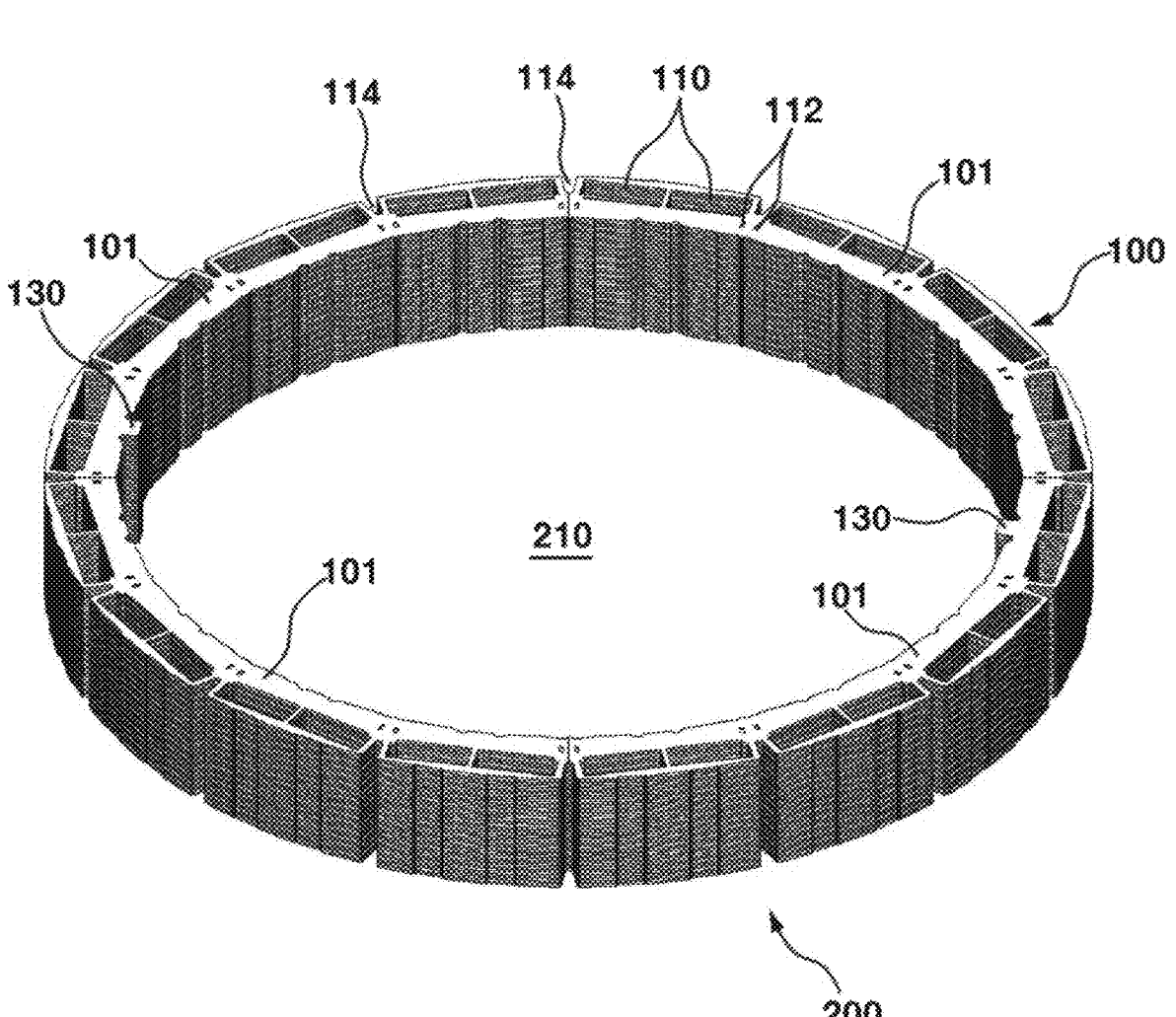
FIG. 5 is a perspective view illustrating a rotor according to a preferred embodiment of the present invention.
Figure 6:
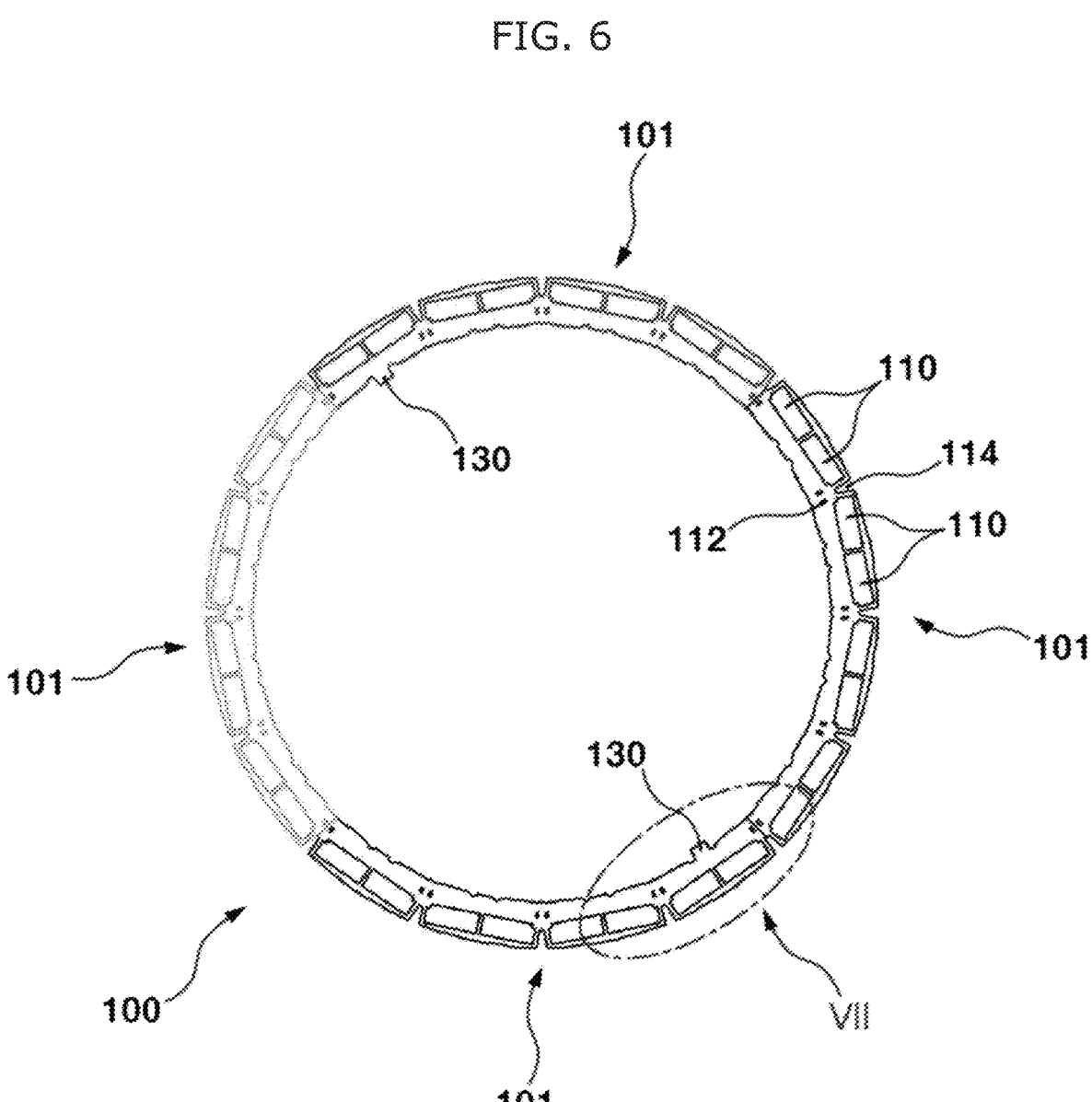
FIG. 6 is a plan view illustrating a lamination sheet constituting the rotor of FIG. 5.
Figure 7:
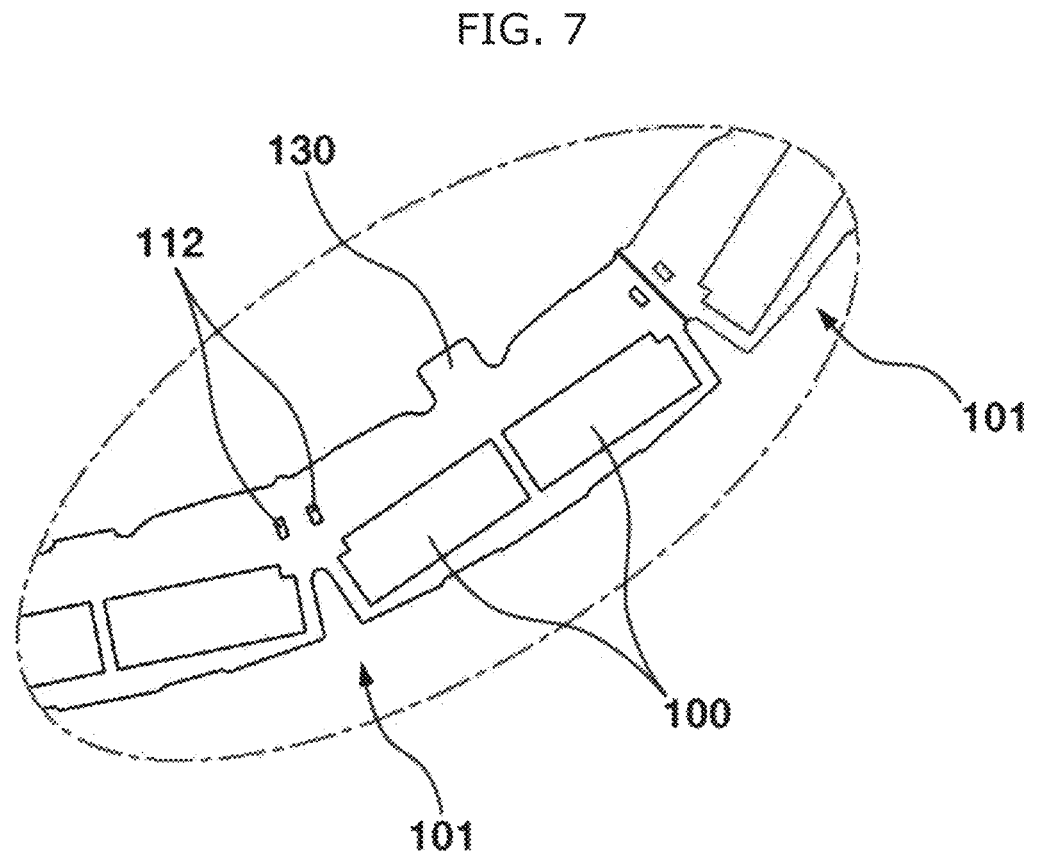

FIG. 5 is a perspective view illustrating a rotor according to an embodiment of the present invention, FIG. 6 is a plan view illustrating a lamination sheet constituting the rotor of FIG. 5, and FIG. 7 is an enlarged view of a portion VII in FIG. 6.

As illustrated in the drawing, a rotor 200 includes a stacked core having a structure in which a plurality of lamination sheets 100 is vertically stacked and coupled to one another. The rotor 200 has a central portion, which is a shaft hole 210, into which a motor shaft (not shown) is inserted.

The plurality of lamination sheets 100 may be vertically coupled to one another using an interlocking tab (embossed protrusion), using an adhesive, using both an interlocking tab (embossed protrusion) and an adhesive (including an adhesive tape), or by welding. Such coupling methods are already known.

Each of the lamination sheets 100 constituting a stator core may be a structure in which a plurality of lamination segments 101 is coupled to one another in a circle. In other words, each of the lamination sheets 100 includes a plurality of lamination segments 101, and has a structure in which the plurality of lamination segments is combined. The plurality of lamination segments 101 is combined in a circularly arranged state so as to constitute one lamination sheet 100.

FIG. 6 illustrates that four lamination segments 101 are arranged in a circumferential direction so as to constitute a circular lamination sheet 100, but the present invention is not limited thereto. The number of lamination segments 101 may be increased or decreased as needed.

The plurality of lamination segments 101 constituting one lamination sheet 100 has the same shape and structure except for the portion where the key 130 protrudes from the inner end thereof. Here, at least a portion of the plurality of lamination segments 101 may have the same position or shape of the key 130 at the inner end thereof.

Accordingly, the lamination segments 101 each having the same shape and structure, that is, each having the same through holes 110, the interlocking tabs 112, the groove 114, etc., are repeatedly arranged in the circumferential direction so as to constitute one lamination sheet 100.

Here, in a state in which the lamination sheets 100 are stacked one on top of another to constitute the stacked core, the through hole 110 in each of the lamination sheets 100 defines an insertion hole, into which a permanent magnet is inserted, in the stacked core.

In addition, the plurality of lamination segments 101 in each lamination sheet 100 is arranged to repeat an identical pattern at every second angle $\theta_2$ with respect to the center of the rotor 200, except for the key 130. The identical pattern may include the through hole 110, the groove 114, an upper layer and lower layer coupling portion (interlocking tab 112, etc.), and the like.

Here, the second angle $\theta_2$ may be calculated using Equation 1 below.

$$\theta_2 = \frac{360°}{n \times p_1} \qquad \text{Equation 1}$$

In Equation 1, n is a number of lamination segments 101 constituting one lamination sheet 100, and $p_1$ is a number of times the shape of the lamination segments 101 in each lamination sheet 100 is repeated in an identical pattern except for a key (here, $p_1 \geq 2$).

As such, the shape of the lamination segments 101 constituting each lamination sheet 100 repeats the identical pattern at every second angle $\theta_2$ except for the key.

In the rotor 200, the through holes 110 may be aligned in a straight line. Specifically, when the lamination sheets 100 are vertically stacked to constitute the stacked core of the rotor 200, the through holes 110 may form a straight line vertically in each of the lamination segments 101 constituting the lamination sheet 100.

As such, the through holes 110 in the lamination sheet may be arranged in a straight line so as to define insertion holes in the stacked core. Here, in the state in which the lamination sheets 100 are stacked to constitute the stacked core, the straight-line insertion holes defined by the through holes 110 in the stacked core, which is a stacked body of the lamination sheets, may each have a permanent magnet (not shown in the drawing) inserted thereinto.

In the drawing, four pairs of through holes 110 are formed in each lamination segment 101, and interlocking tabs 112 and grooves 114 are formed for every pair of through holes. Accordingly, a pair of through holes 110, a pair of interlocking tabs 112, and a groove 114 are repeated four times in the same pattern for each lamination segment 101.

When an upper layer lamination segment 101 and a lower layer lamination segment 101 are stacked to be coupled to each other, the through holes 110 in each layer are stacked to be coupled to each other so as to be aligned in a straight line up and down. In addition, in the drawing, each of the lamination sheets 100 includes four lamination segments 101, and the lamination segments 101 are repeated four times in an identical pattern for each of the lamination sheets 100.

The interlocking tab 112 is a groove concave downwards, and the interlocking tab 112 of each lamination segment is press fitted to the interlocking tab 112 of the lamination segment 101 disposed therebelow. Press fit coupling using the interlocking tab 112 is well known.

In order to vertically couple the upper layer lamination segment 101 to the lower layer lamination segment 101, an adhesive may be used instead of the interlocking tab 112, or both the interlocking tab 112 and the adhesive may be used. The interlocking tab 112 may be formed in the lamination segment 101 at equal intervals, for example, at intervals of the second angle $\theta_2$. In addition, the interlocking tab 112 may be constantly formed between every pair of through holes 110.

Figure 3:
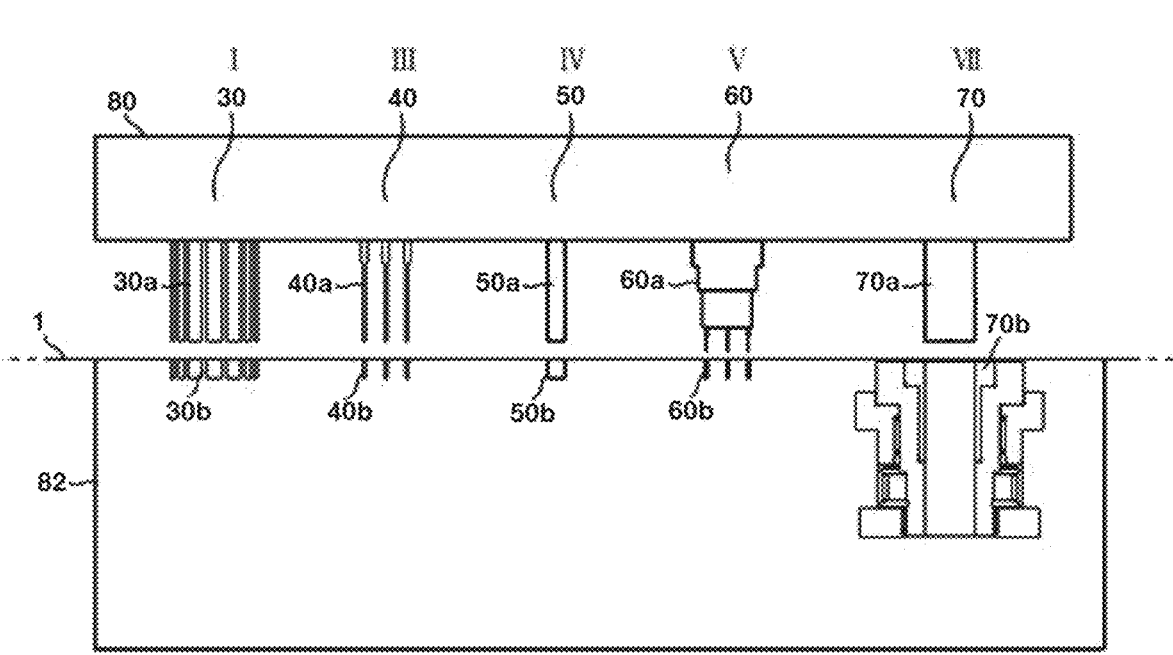
FIG. 3 is a front view schematically illustrating the structure of a stacked core manufacturing apparatus according to the related art.

The groove 114 may be formed in the outer circumferential side of the lamination segment 101 at predetermined intervals, for example, at intervals of the second angle $\theta_2$. The groove 114 is a portion into which a protrusion formed on the inner surface of the stacking barrel 70*b* is inserted when the lamination segment 101 is fitted into the stacking barrel 70*b* (see FIG. 3). The protrusion and the groove 114 prevent the lamination segment 101 from rotating arbitrarily while and after the lamination segment 101 is inserted into the stacking barrel 70*b*. The groove 114 may be constantly formed between every pair of through holes 110.

The lamination sheet 100 has an inner surface having formed thereon a straight key 130. The straight key 130 is inserted into and coupled to a key way formed in the axial direction of the motor shaft (not shown in the drawing). Accordingly, the key 130 and the key way allow the motor shaft to rotate integrally with the rotor. One or more keys 130 may be formed for each lamination sheet 100.

In the drawing, two keys 130 are formed on the lamination sheet 100 at an interval of 180°, but the number of keys 130 and the interval between the keys 130 may be increased or decreased as needed.

As described above, the rotor 200 has a structure in which a plurality of lamination sheets 100 is stacked vertically. Here, the lamination segments 101 must be stacked one on top of another so that the keys 130 are aligned in a straight line vertically. In addition, only when the end of the upper layer lamination segment 101 is stacked on a portion corresponding to a continuous portion of the lower layer lamination segment 101 (e.g., a middle portion of the lower layer lamination segment), may the lamination segments 101 of each layer be coupled to one another to have a circular shape.

Hereinafter, the same will be described with reference to FIGS. 8 to 10.

Method of Manufacturing Rotor

Figure 8:
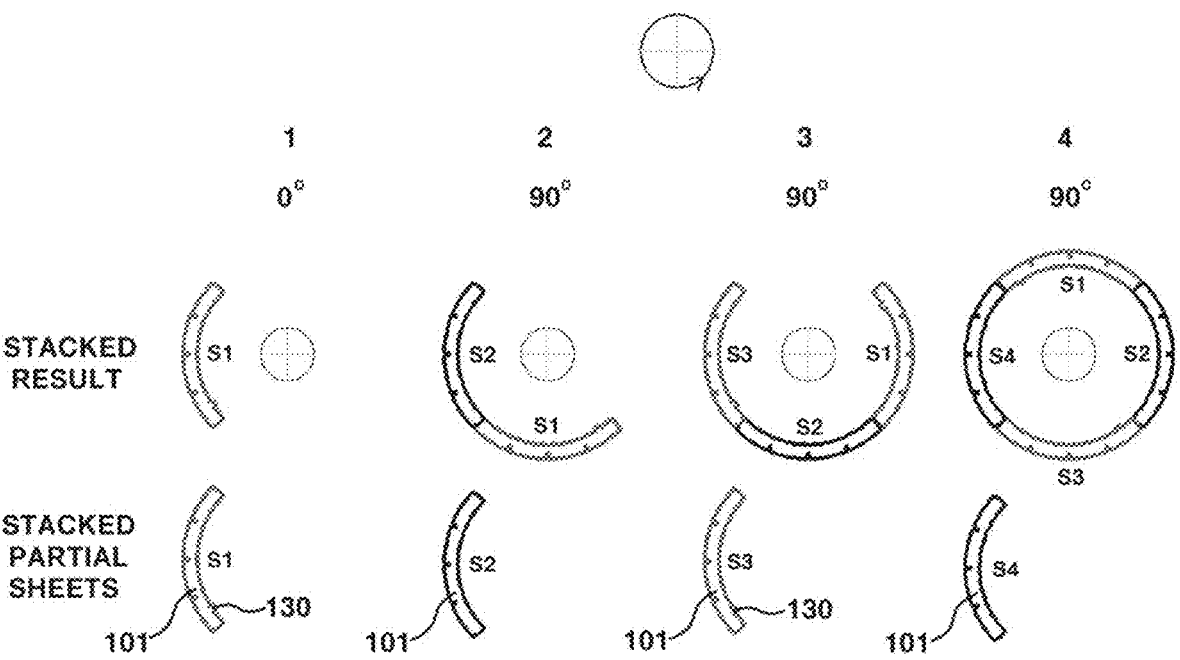
FIG. 8 is a view sequentially showing a process of manufacturing a first layer lamination sheet in which lamination segments are stacked inside a stacking barrel in embodiments of the present invention.
Figure 9:
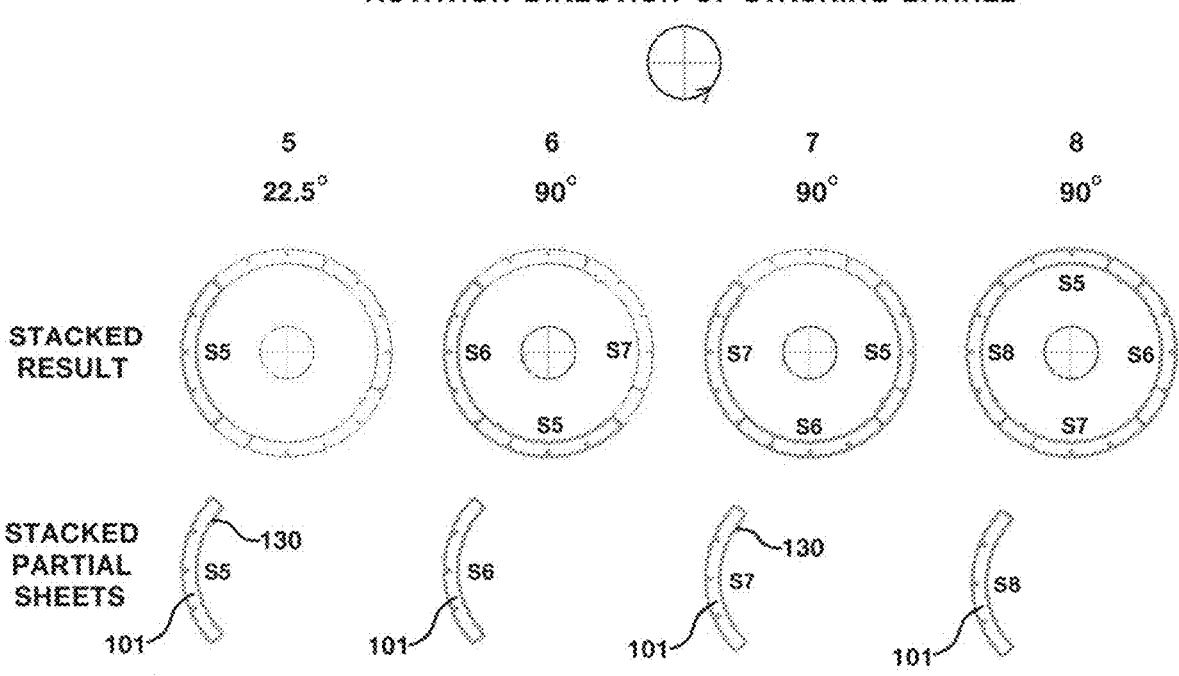
FIG. 9 is a view sequentially showing a process of manufacturing a second layer lamination sheet in which lamination segments are stacked on the first layer lamination sheet in embodiments of the present invention.

FIG. 8 is a view sequentially showing the process of manufacturing a first layer lamination sheet 100 in which lamination segments 101 are stacked inside the stacking barrel (70*b* in FIG. 3), and FIG. 9 is a view sequentially showing the process of manufacturing a second layer lamination sheet 100 in which lamination segments 101 are stacked on the first layer lamination sheet 100. FIG. 10 is a view sequentially showing the process of manufacturing a third layer lamination sheet 100 in which lamination segments 101 are stacked on the second layer lamination sheet 100.

Figure 10:
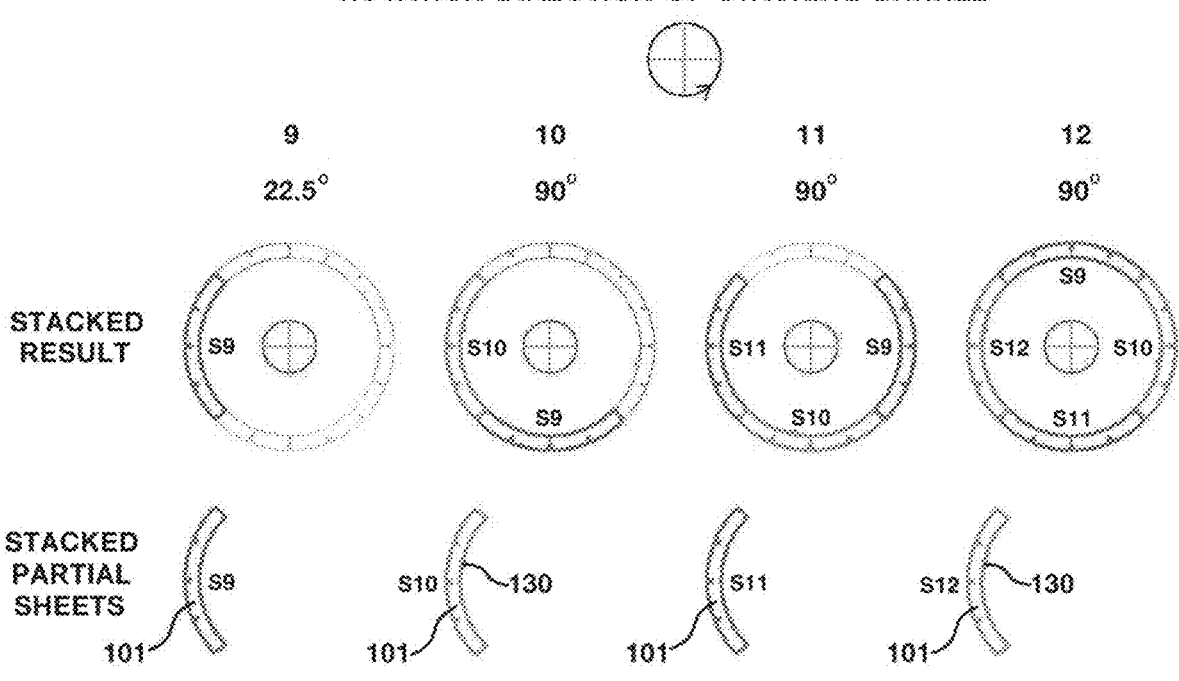
FIG. 10 is a view sequentially showing a process of manufacturing a third layer lamination sheet in which lamination segments are stacked on the second layer lamination sheet in embodiments of the present invention.

In FIGS. 8 to 10, the numbers 1, 2, 3, . . . , 12 denote the number of each step, and 0°, 90°, 90°, and 22.5° denote the counterclockwise rotation angle of the stacking barrel. In addition, the expression "stacked partial sheets" indicates lamination segments 101 each being blanked at each step and supplied to the inside of the stacking barrel, and the expression "stacked result" indicates a state in which the "stacked partial sheets" are stacked and assembled.

The stacking barrel 70*b* periodically repeats counterclockwise rotation and stoppage.

In FIGS. 8 to 10, illustration of the through holes 110 and the interlocking tabs 112 formed in each lamination segment 101 is omitted. Further, in FIGS. 9 and 10, the lower layer lamination segments are indicated using thin lines, and the lamination segments (S5 to S12) of a layer currently being stacked are indicated using thick lines.

Manufacture of First Layer Lamination Sheet

As illustrated in FIG. 8, when stacking starts, the stacking barrel 70*b* is at a position of 0°.

In a first step, the lamination segment 101 (S1 in FIG. 8) is blanked, and then is supplied and placed inside the stacking barrel 70*b*. The lamination segment 101 has a key 130 formed thereon. Because the manufacturing process of the lamination segment 101 using a press mold will be easily understood by those skilled in the art by referring to this specification, description thereof will be omitted.

Figure 4:
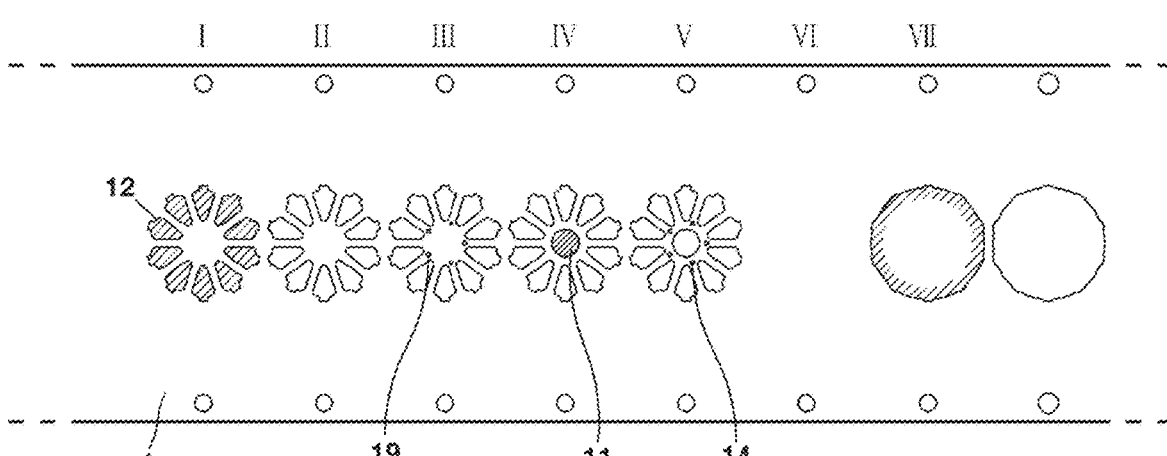
FIG. 4 is a plan view illustrating a metal strip undergoing a process in which a lamination sheet is manufactured by the stacked core manufacturing apparatus of FIG. 3.

However, the first layer lamination segment 101 has formed therein the counter holes (reference numeral 19 in FIG. 4) instead of the interlocking tabs 112. In other words, the counter holes (reference numeral 19 in FIG. 4) are formed instead of the interlocking tabs 112 so as to prevent coupling to the lamination segments 101 manufactured in the previous process.

Thereafter, in a second step, the stacking barrel 70*b* is rotated by 90°, and then a new lamination segment 101 (S2 in FIG. 8) is blanked and supplied into the stacking barrel 70*b*. The lamination segment 101 (S2) may have an end brought into contact with or located very close to the end of the lamination segment 101 (S1) (i.e., the first step) circumferentially neighboring the same.

Because four lamination segments 101 constitute one lamination sheet 100, the stacking barrel 70*b* is rotated by 90° so as to position the lamination segment 101 (S2) manufactured in the second step to align with the end of the lamination segment 101 (S1) manufactured in the first step.

In this specification, stacking the lamination segments 101 while constantly rotating the stacking barrel 70*b* at predetermined angular intervals is referred to as "index stacking." Index stacking is disclosed in Korean Patent Registration No. 10-0578043, and all contents disclosed in the patent registration are included in this specification.

During the index stacking, the stacking barrel 70*b* is rotated by a third angle $\theta_3$ (index angle). The third angle $\theta_3$ may be calculated using Equation 2 below.

$$\theta_3 = \frac{360°}{n} \qquad \text{Equation 2}$$

In Equation 2, n is a number of lamination segments constituting one lamination sheet.

In the index stacking, even if there is a thickness variation between the lamination sheets 100 or the lamination segments 101, the thickness variation may be eliminated because the same are stacked while the stacking barrel 70*b* is rotated, and thus the rotor 200 may be made vertical.

Next, in a third step, the stacking barrel 70*b* is rotated by 90° again, and then a new lamination segment 101 (S3 in FIG. 8) is blanked and supplied into the stacking barrel 70*b*. Similarly, in a fourth step, the stacking barrel 70*b* is rotated by 90° again, and then a new lamination segment 101 (S4 in FIG. 8) is blanked and supplied into the stacking barrel 70*b*.

As such, four lamination segments 101 may be arranged in a circle. Among the four lamination segments 101, at least some lamination segments 101 (S1 and S3) may have a key 130, and the remaining lamination segments 101 (S2 and S4) may not have a key.

Manufacture of Second Layer Lamination Sheet

After manufacturing of the first layer lamination sheet is completed, the stacking barrel 70*b* is rotated counterclockwise at a first angle $\theta_1$ as illustrated in FIG. 9. The first angle $\theta_1$ may be an angle at which an identical pattern is repeated in the lamination segment 101 or an integer multiple of the angle.

For example, because four pairs of through holes 110, four pairs of interlocking tabs 112, and four grooves 114 are formed at regular intervals in the lamination segment 101 in the drawing, the first angle $\theta_1$ may be any one of 22.5°, 45°, and 67.5°.

The first angle $\theta_1$ may be calculated using Equation 3 below.

$$\theta_1 = \frac{360°}{n \times p_1} \times m \qquad \text{Equation 3}$$

In Equation 3, n is a number of lamination segments 101 constituting one lamination sheet 100, $p_1$ is a number of times the shape of the lamination segments 101 in each lamination sheet 100 is repeated in an identical pattern except for a key (here, $p_1 \geq 2$), and m is an integer greater than or equal to 1 and less than $p_1$ (an integer that determines the phase difference between each layer).

Comparing Equations 1 and 3, the first angle $\theta_1$ and the second angle $\theta_2$ have a relationship of '$\theta_1 = \theta_2 \times m$'.

Hereinafter, for convenience of description, it will be assumed that the first angle $\theta_1$ is 22.5°.

As illustrated in FIG. 9, in a fifth step, after the stacking barrel 70*b* is rotated by 22.5°, a new lamination segment 101 (S5) is stacked on the first layer lamination sheet. When the stacking barrel 70*b* is rotated by 22.5°, the first layer lamination sheet is also rotated by 22.5°.

In this state, once the new lamination segment is stacked on top of the lamination segment of the first layer lamination sheet in the stacking barrel, the key 130 of the new lamination segment 101 (S5) is disposed at a position corresponding to the key 130 of the first layer lamination segment that has been rotated by 22.5°.

In addition, because the through holes 110, the counter holes (formed at the same position as the interlocking tab 112), and the groove 114 in the first layer lamination segment 101 are equally repeatedly arranged every 22.5°, the first layer lamination segment 101 may be coupled to the second layer lamination segment 101 even when the first layer lamination segment 101 is rotated by 22.5°.

The through holes 110, the interlocking tabs 112, and the groove 114 in the second layer lamination segment 101 may be disposed directly above the through holes 110, the counter holes, and the groove 114 in the first layer lamination segment, and in the circumferential direction, the through holes 110, the interlocking tabs 112 (counter holes in the case of the first layer), and the groove in each of the two lamination segments may be aligned at the same positions. The alignment is equally applied to the third and fourth layer lamination sheets above the second layer lamination sheet, and even to the upper layers of the lamination sheets.

In addition, due to such a stacking manner, the end of the second layer lamination segment 101 may correspond to and align with the position of the continuous portion of the first layer lamination segment 101 (e.g., the middle portion of the first layer lamination segment).

Moreover, the continuous portion of the second layer lamination segment 101 (e.g., the middle portion of the second layer lamination segment) may correspond to and align with the position of the end of the first layer lamination segment 101.

As a result, the first layer lamination segments 101 and the second layer lamination segments 101 are coupled to each other as described above, and thus the second layer lamination segments 101 may also be arranged and coupled to one another to have a circular shape like the first layer lamination segments do.

In other words, even if there is no medium configured to transversely couple the second layer lamination segments 101 to one another, just by coupling the second layer lamination segments 101 to the first layer lamination segments 101, the second layer lamination segments 101 may be arranged, coupled, and fixed in a circle, like the first layer lamination segments.

Next, in a sixth step, the stacking barrel 70b is rotated by 90° again, and then a new lamination segment 101 (S6 in FIG. 9) is stacked. Thereafter, in a seventh step, the stacking barrel 70b is rotated by 90° again, and then a new lamination segment 101 (S7 in FIG. 9) is stacked. The lamination segment 101 stacked in this way also has a key 130 at a position corresponding to the key 130 of the first layer lamination segment that has been rotated by 90°.

Next, in an eighth step, the stacking barrel 70b is rotated by 90° again, and then a new lamination segment 101 (S8 in FIG. 9) is stacked.

Manufacture of Third Layer Lamination Sheet

In a ninth step, the stacking barrel 70b is rotated by 22.5° (first angle, $\theta_1$) again, and then a new third layer lamination segment 101 (S9 in FIG. 10) is stacked on the second layer lamination sheet.

When the stacking barrel 70b is rotated by 22.5°, the first layer lamination segments and the second layer lamination segments are also rotated by 22.5°. In addition, because through holes 110, the interlocking tabs 112, and the groove 114 in the second layer lamination segment 101 are equally repeatedly arranged every 22.5°, the second layer lamination segment 101 may be coupled to the third layer lamination segment 101 even when the second layer lamination segment 101 is rotated by 22.5°.

The through holes 110, the interlocking tabs 112, and the groove 114 in the third layer lamination segment 101 may be disposed directly above the through holes 110, the interlocking tabs 112, and the groove 114 in the second layer lamination segment, and in the circumferential direction, the through holes 110, the interlocking tabs 112, and the groove in each of the two lamination segments may be aligned at the same positions.

In addition, due to such a stacking manner, the end of the third layer lamination segment 101 may correspond to and align with the position of the continuous portion of the second layer lamination segment 101, and the continuous portion of the third layer lamination segment 101 (e.g., the middle portion of the third layer lamination segment) may correspond to and align with the position of the end of the second layer lamination segment 101.

The second layer lamination segments 101 and the third layer lamination segments 101 are coupled to each other in this way, and thus the third layer lamination segments 101 may also be arranged and coupled to one another to have a circular shape like the second layer lamination segments do. In other words, even if there is no medium configured to transversely couple the third layer lamination segments 101 to one another, just by coupling the third layer lamination segments 101 to the second layer lamination segments 101, the third layer lamination segments 101 may be arranged and coupled in a circle, like the second layer lamination segments.

Next, in a tenth step, the stacking barrel 70b is rotated by 90° again, and then a new lamination segment 101 (S10 in FIG. 10) is stacked. The newly stacked lamination segment 101 (S10) has a key 130 formed thereon. The key 130 of the newly stacked lamination segment may be aligned with the key 130 of the second layer lamination segment rotated by 90°. Accordingly, when the lamination segments 101 are stacked, the keys 130 of the upper and lower lamination sheets form a straight line vertically.

Thereafter, in an eleventh step, the stacking barrel 70b is rotated by 90° again, and then a new lamination segment 101 (S11 in FIG. 10) is stacked. Next, in a twelfth step also, the stacking barrel 70b is rotated by 90° again, and then a new lamination segment 101 (S12 in FIG. 10) is stacked. Here also, the newly stacked lamination segment 101 has a key 130 at a position corresponding to the key 130 of the second layer lamination segment that has been rotated by 90°.

As the lamination segments 101 are repeatedly stacked through the above described process, new lamination sheets are continuously stacked. After that, when the number of stacked lamination sheets 100 does not reach a predetermined number, stacking continues, and when the number of stacked lamination sheets 100 reaches the predetermined number, stacking is stopped and the rotor 200 is discharged downwards.

Alternatively, after the number of stacked lamination sheets reaches the predetermined number, a process of preparing a lamination segment, stacking the prepared lamination segment in the stacking barrel, and then rotating the stacking barrel by $-\theta_3$ is repeated until a circular lamination sheet is completed. When the circular lamination of one layer is completed, a process of rotating the stacking barrel by $-\theta_1$ may be performed.

Equation to Calculate Position of Key

Figure 11:
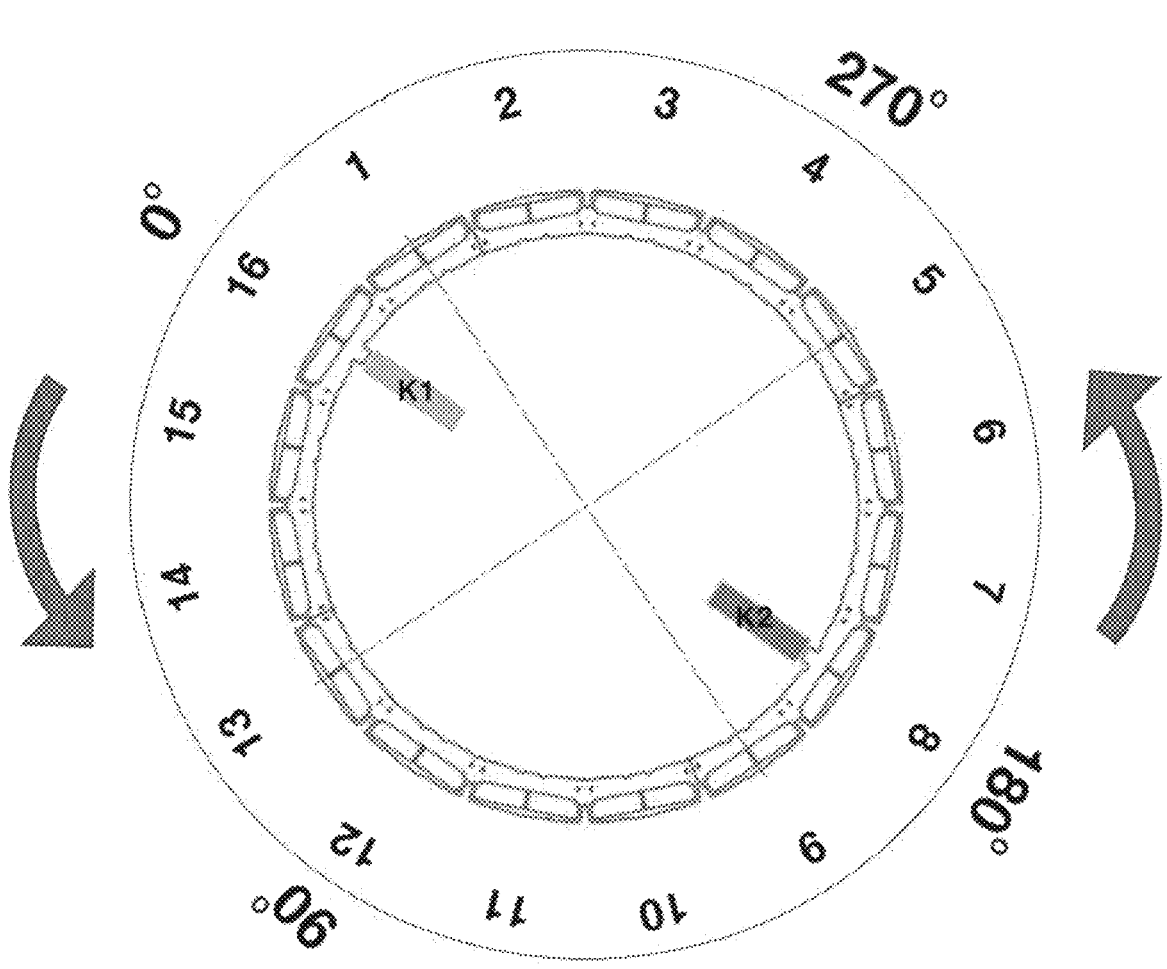
FIG. 11 is a view in which slot numbers are marked on the lamination sheet of FIG. 6 and the rotation direction of a stacking barrel during stacking is indicated by arrows.

The position of the key 130 in each lamination segment 101 may be calculated using Equation 4 below. Equation 4 below may be applied when two keys 130 K1 and K2 are formed at an interval of 180° in the lamination sheet 100, as illustrated in FIG. 11.

$$\theta_{key} = \frac{360°}{n} \times \left( s - 1 - \frac{s - 1 - \mathrm{mod}(s-1, n)}{n} \times \left( 1 - \frac{m}{p} \right) \right) \qquad \text{Equation 4}$$

In Equation 4, $\theta_{key}$ is an angle indicating where a key is located when an sth lamination segment is stacked in a stacking barrel, s is an order of a lamination segment being stacked, mod(s−1, n) is a function representing the remainder when 's−1' is divided by 'n', m is an integer that determines the phase difference between each layer (1≤m<p), and p is a number of slots in each lamination segment (p=p₁).

When the lamination segments 101 are prepared so that the keys K1 and K2 are positioned at the angle $\theta_{key}$ in the punching step, the keys K1 and K2 of the upper and lower lamination segments may form a straight line up and down in the state in which the lamination segments 101 are stacked in the stacking barrel.

FIG. 11 is a view in which slot numbers are marked on the lamination sheet of FIG. 6 and the rotation direction of the stacking barrel during stacking is indicated by arrows, and FIG. 12 is a table showing angles $\theta_{key}$ at which keys K1 and K2 are located in each lamination segment 101.

In FIG. 12, each lamination segment 101 is stacked at an angle of 0° to 67.5° (slot numbers 13 to 16, indicated by dotted lines) inside the stacking barrel 70b. In FIG. 12, K1 denotes an angle $\theta_{key}$ at which the 'K1' key 130 of FIG. 11 is located, and K2 denotes an angle $\theta_{key}$ at which the 'K2' key 130 of FIG. 11 is located.

The 'K1' key 130 and the 'K2' key 130 have an angular difference of 180°. For example, when a thirteenth lamination segment 101 is stacked in the stacking barrel, s equals 13, n equals 4, m equals 1, and p (the number of slots) equals 4, thus the angle $\theta_{key}$ equals 157.5°.

Accordingly, the thirteenth lamination segment 101 does not have a $\theta_{key}$ at an angle from 0° to 67.5° (slot numbers 13 to 16), and thus the thirteenth lamination segment 101 does not have a key formed thereon.

As another example, when s equals 2, this means that a second lamination segment 101 is stacked, n equals 4, m equals 1, and p (the number of slots) equals 4, thus the angle $\theta_{key}$ equals 90°. Accordingly, when the second lamination segment 101 is stacked in the stacking barrel, the angle $\theta_{key}$ equals 90° and 270°. Here, as the second lamination segment 101 does not have a $\theta_{key}$ at an angle from 0° to 67.5° (slot numbers 13 to 16), the second lamination segment 101 does not have a key formed thereon.

As described above, when two keys K1 and K2 are formed in each lamination sheet 100 at an interval of 180°, the angle $\theta_{key}$ at which the keys K1 and K2 are located may be calculated using Equation 4. In addition, as shown in FIG. 12, in this case, the same angle $\theta_{key}$ is repeated every thirty-second time, and the first lamination sheet and the thirty-third lamination sheet have keys K1 and K2 at the same angle $\theta_{key}$.

Meanwhile, even when only one key is formed in the lamination sheet of each layer, the angle $\theta_{key}$ may be calculated according to the above principle. In this case, the same angle $\theta_{key}$ is repeated every sixty-fourth time.

As is apparent from the above description, a rotor and a method of manufacturing the same according to embodiments of the present invention provide the following effects.

First, several lamination segments are stacked to complete a circular lamination sheet, and an end of an upper layer lamination segment is stacked on a portion corresponding to a continuous portion of a lower layer lamination segment (e.g., the middle portion of the lower layer lamination segment) so as to allow the lamination segments of each layer to be coupled to one another to have a circular shape. Accordingly, a circular lamination sheet may be completed by coupling the upper layer lamination segment to the lower layer lamination segment, and thus there is no need to provide a separate coupling means configured to transversely couple the lamination segments in the same layer to one another.

Second, lamination segments are index-stacked to manufacture a rotor, and keys on upper and lower lamination sheets are arranged in a straight line in a vertical direction so that the keys are coupled to a key way in a motor shaft.

Third, lamination segments are prepared from a metal strip, the same are index-stacked to complete a circular lamination sheet, and then the circular lamination sheets are stacked one on top of another so that raw materials may be saved and the rotor may maintain straightness in a vertical direction.

In the above, embodiments of the present invention have been described with reference to the accompanying drawings. However, those skilled in the art to which the present invention pertains will understand that various modifications may be made therefrom, and that all or part of the above-described embodiments may be selectively combined. Therefore, the true technical protection scope of the present invention should be determined by the technical ideas of the appended claims.

What is claimed is:

1. A rotor comprising:

a stacked core comprising a plurality of lamination sheets stacked one on top of another, each of the lamination sheets comprising a plurality of lamination segments arranged in a circle, wherein the stacked core has an upper layer lamination segment coupled to a lower layer lamination segment with a phase difference of a first angle $\theta_1$ with respect to a center of the stacked core, wherein the lamination segments that are stacked one on top of another each have a first key and a second key, wherein each of the first keys is arranged in a straight line on an inner surface of the stacked core and each of the second keys is arranged in a straight line on the inner surface of the stacked core so that the first keys and the second keys are inserted into a key way of a motor shaft in an axial direction, wherein each of the lamination segments has a substantially identical shape and substantially identical pattern except for the first and second keys, and the substantially identical shape and the substantially identical pattern are arranged to be repeated in each of the lamination segments with an interval of a second angle $\theta_2$ with respect to the center, wherein the lamination segments each comprise upper layer and lower layer coupling portions repeatedly disposed at intervals of the second angle $\theta_2$ in a circumferential direction, wherein there is a third angle $\theta_3$ between the first keys and the second keys, and wherein the third angle $\theta_3$ is equal to 180°.

2. The rotor according to claim 1, wherein the lamination segments each further comprise through holes repeatedly disposed at intervals of the second angle $\theta_2$ in the circumferential direction.

3. The rotor according to claim 2, wherein, in the stacked core, the through holes in the lamination segments stacked one on top of another are arranged in a straight line so as to define an insertion hole.

4. The rotor according to claim 3, further comprising a permanent magnet inserted into the insertion hole in the stacked core.

5. The rotor according to claim 1, wherein the upper layer and lower layer coupling portions of each of the lamination segments are interlocking tabs configured to couple the upper layer lamination segment to the lower layer lamination segment.

6. The rotor according to claim 5, wherein the interlocking tabs are groove and protrusion configurations.

7. The rotor according to claim 1, wherein, in a state in which an end of the upper layer lamination segment is arranged to correspond to a continuous portion of the lower layer lamination segment, the upper layer lamination segment is coupled to the lower layer lamination segment using the upper layer and lower layer coupling portions, thereby retaining coupling, without a separate coupling mechanism, between the lamination segments as arranged in the circle.

8. A rotor comprising:

a stacked core comprising a plurality of lamination sheets stacked one on top of another, each of the lamination sheets comprising a plurality of lamination segments arranged in a circle, wherein the stacked core has an upper layer lamination segment coupled to a lower layer lamination segment with a phase difference of a first angle $\theta_1$ with respect to a center of the stacked core, wherein the lamination segments that are stacked one on top of another each have a first key and a second key, wherein each of the first keys is arranged in a straight line on an inner surface of the stacked core and each of the second keys is arranged in a straight line on the inner surface of the stacked core so that the first keys and the second keys are inserted into a key way of a motor shaft in an axial direction, wherein each of the lamination segments has a substantially identical shape and a substantially identical pattern except for the first and second keys, and the substantially identical shape and the substantially identical pattern are arranged to be repeated in each of the lamination segments with an interval of a second angle $\theta_2$ with respect to the center, wherein the lamination segments each comprise upper layer and lower layer coupling portions repeatedly disposed at intervals of the second angle $\theta_2$ in a circumferential direction, wherein the first keys and the second keys are arranged at an angle $\theta_{key}$, each of the lamination sheets comprises two keys at intervals of 180° in the circumferential direction, wherein the angle $\theta_{key}$ of an sth lamination segment is determined based on $$\theta_{key} = \frac{360°}{n} \times \left( s - 1 - \frac{s - 1 - \mathrm{mod}(s - 1, n)}{n} \times \left( 1 - \frac{m}{p} \right) \right),$$

and wherein $\theta_{key}$ is an angle indicating where the key is located when the sth lamination segment is stacked in a stacking barrel, s is an order of the lamination segment being stacked, mod(s−1, n) is a function representing a remainder when 's−1' is divided by 'n', m is an integer that determines the phase difference between each layer ($1 \leq m < p$), and p is a number of slots in each lamination segment (p).

9. The rotor according to claim 8, wherein the lamination segments each further comprise through holes repeatedly disposed at intervals of the second angle $\theta_2$ in the circumferential direction.

10. The rotor according to claim 9, wherein, in the stacked core, the through holes in the lamination segments stacked one on top of another are arranged in a straight line so as to define an insertion hole.

11. The rotor according to claim 10, further comprising a permanent magnet inserted into the insertion hole in the stacked core.

12. The rotor according to claim 8, wherein the upper layer and lower layer coupling portions of each of the lamination segments are interlocking tabs configured to couple the upper layer lamination segment to the lower layer lamination segment.

13. The rotor according to claim 8, wherein, in a state in which an end of the upper layer lamination segment is arranged to correspond to a continuous portion of the lower layer lamination segment, the upper layer lamination segment is coupled to the lower layer lamination segment using the upper layer and lower layer coupling portions, thereby retaining coupling, without a separate coupling mechanism, between the lamination segments as arranged in the circle.

14. A rotor comprising:

a stacked core comprising a plurality of lamination sheets stacked one on top of another, each of the lamination sheets comprising a plurality of lamination segments arranged in a circle, wherein the stacked core has an upper layer lamination segment coupled to a lower layer lamination segment with a phase difference of a first angle $\theta_1$ with respect to a center of the stacked core, wherein the lamination segments that are stacked one on top of another each have a first key and a second key, wherein each of the first keys is arranged in a straight line on an inner surface of the stacked core and each of the second keys is arranged in a straight line on the inner surface of the stacked core so that the first keys and the second keys are inserted into a key way of a motor shaft in an axial direction, wherein each of the lamination segments has a substantially identical shape and a substantially identical pattern except for the first and the second keys, and the substantially identical shape and the substantially identical pattern are arranged to be repeated in each of the lamination segments with an interval of a second angle $\theta_2$ with respect to the center, wherein the lamination segments each comprise upper layer and lower layer coupling portions repeatedly disposed at intervals of the second angle $\theta_2$ in a circumferential direction, wherein the lamination sheets each comprise the lamination segments having the substantially identical shape repeated in the substantially identical pattern at every second angle $\theta_2$ with respect to the center except for the keys protruding from the inner surface of the stacked core, wherein the first angle $\theta_1$ and the second angle $\theta_2$ are determined based on $$\theta_1 = \frac{360°}{n \times p_1} \times m = \theta_2 \times m$$

and $$\theta_2 = \frac{360°}{n \times p_1},$$

and
   wherein n is a number of lamination segments constituting one lamination sheet, $p_1$ is a number of times ($p_1 \geq 2$) that the shape of the lamination segments and the substantially identical pattern, except for the keys, are repeated in each of the lamination segments, and m is an integer greater than or equal to 1 and smaller than $p_1$.

15. The rotor according to claim 14, wherein the lamination segments each further comprise through holes repeatedly disposed at intervals of the second angle $\theta_2$ in the circumferential direction.

16. The rotor according to claim 15, wherein, in the stacked core, the through holes in the lamination segments stacked one on top of another are arranged in a straight line so as to define an insertion hole.

17. The rotor according to claim 16, further comprising a permanent magnet inserted into the insertion hole in the stacked core.

18. The rotor according to claim 14, wherein the upper layer and lower layer coupling portions of each of the lamination segments are interlocking tabs configured to couple the upper layer lamination segment to the lower layer lamination segment.

19. The rotor according to claim 14, wherein, in a state in which an end of the upper layer lamination segment is arranged to correspond to a continuous portion of the lower layer lamination segment, the upper layer lamination segment is coupled to the lower layer lamination segment using the upper layer and lower layer coupling portions, thereby retaining coupling, without a separate coupling mechanism, between the lamination segments as arranged in the circle.

20. The rotor according to claim 14,
   wherein there is a third angle $\theta_3$ between the first keys and the second keys, and
   wherein the third angle $\theta_3$ is equal to 180°.

* * * * *